United States Patent
Gaal et al.

(10) Patent No.: US 9,276,722 B2
(45) Date of Patent: Mar. 1, 2016

(54) EXPANDED SEARCH SPACE FOR R-PDCCH IN LTE-A

(75) Inventors: Peter Gaal, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 13/100,801

(22) Filed: May 4, 2011

(65) Prior Publication Data

US 2011/0274031 A1 Nov. 10, 2011

Related U.S. Application Data

(60) Provisional application No. 61/331,797, filed on May 5, 2010.

(51) Int. Cl.
*H04B 7/14* (2006.01)
*H04L 5/00* (2006.01)
*H04B 7/26* (2006.01)
(Continued)

(52) U.S. Cl.
CPC ............ *H04L 5/0051* (2013.01); *H04L 5/0053* (2013.01); *H04L 5/0092* (2013.01); *H04B 7/2606* (2013.01); *H04L 5/0023* (2013.01); *H04L 5/0041* (2013.01); *H04L 5/0082* (2013.01); *H04W 24/00* (2013.01); *H04W 84/047* (2013.01)

(58) Field of Classification Search
USPC ........................... 370/315, 328, 329, 338, 401
See application file for complete search history.

(56) References Cited

U.S. PATENT DOCUMENTS 8,270,359 B2 * 9/2012 Nangia et al. ................. 370/329
8,385,264 B2 * 2/2013 Baldemair et al. ............ 370/328
(Continued)

FOREIGN PATENT DOCUMENTS

CN 101541063 A 9/2009
JP 2009527973 A 7/2009
(Continued)

OTHER PUBLICATIONS

Bell, et al., "Relaying for LTE-Advanced", 3GPP Draft; R1-090066, Relaying for LTE-Advanced, 3rd Generation Partnership Project (3GPP), Mobile Competence Centre ; 650, Route Des Lucioles ; F-06921 Sophia-Antipolis Cedex ; France, no. Ljubljana; Jan. 8, 2009, XP050318011, [retrieved on Jan. 8, 2009].
(Continued)

*Primary Examiner* — Ricky Ngo
*Assistant Examiner* — Christine Ng
(74) *Attorney, Agent, or Firm* — Ke Liu

(57) ABSTRACT

Certain aspects of the present disclosure provide techniques and apparatuses for providing an expanded search space for a relay-specific control channel on a backhaul link. According to certain aspects, due to inband interference, a Relay Physical Downlink Control Channel (R-PDCCH) may be signaled utilizing resources reserved for backhaul data. According to certain aspects, a two-dimensional search space may be provided for R-PDCCH. R-PDCCH may be transmitted in one of a plurality of layer-specific search spaces corresponding to one of a plurality of antenna ports. Further, in a layer-specific search space, R-PDCCH may be transmitted using at least one of multiple R-PDCCH decoding candidates from a common search space and/or a relay node-specific search space.

48 Claims, 6 Drawing Sheets

(51) Int. Cl.
*H04W 24/00* (2009.01)
*H04W 84/04* (2009.01)

(56) References Cited

U.S. PATENT DOCUMENTS

| | | | |
|---|---|---|---|
| 2009/0279500 A1* | 11/2009 | Luo et al. | 370/330 |
| 2010/0111107 A1* | 5/2010 | Han et al. | 370/472 |
| 2010/0115358 A1* | 5/2010 | Kotecha et al. | 714/748 |
| 2010/0303011 A1* | 12/2010 | Pan et al. | 370/328 |
| 2010/0304689 A1* | 12/2010 | McBeath et al. | 455/68 |
| 2011/0069637 A1* | 3/2011 | Liu et al. | 370/254 |
| 2011/0141987 A1* | 6/2011 | Nam et al. | 370/329 |
| 2011/0243059 A1* | 10/2011 | Liu et al. | 370/315 |
| 2011/0249640 A1* | 10/2011 | Soong et al. | 370/329 |
| 2012/0207082 A1* | 8/2012 | Liu et al. | 370/329 |
| 2013/0021989 A1* | 1/2013 | Tiirola et al. | 370/329 |

FOREIGN PATENT DOCUMENTS

| | | |
|---|---|---|
| WO | WO-2007096820 A1 | 8/2007 |
| WO | WO-2008018468 A1 | 2/2008 |
| WO | WO-2009104848 A1 | 8/2009 |

OTHER PUBLICATIONS

International Search Report and Written Opinion—PCT/US2011/035414—ISA/EPO—Dec. 20, 2011.
LG Electronics: "Resource Allocation and Downlink Control Channel Structure for Relay Backhaul Link", 3GPP Draft; R1-094189, RPDCCH LGE, 3rd Generation Partnership Project (3GPP), Mobile Competence Centre ; 650, Route Des Lucioles ; F-06921 Sophia-Antipolis Cedex ; France, no. Miyazaki; Oct. 12, 2009, XP050388659, [retrieved on Oct. 6, 2009].
Love R., et al., "Downlink Control Channel Design for 3GPP LTE", Wireless Communications and Networking Conference, 2008, WCNC 2008, IEEE, Piscataway, NJ, USA, Mar. 31, 2008, pp. 813-818, XP031243734, ISBN: 978-1-4244-1997-5.
Nokia, et al., "Discussions on Backhaul Reference Signal Design", 3GPP Draft; R1-102968, Discussions on Backhaul Reference Signal Design, 3rd Generation Partnership Project (3GPP), Mobile Competence Centre ; 650, Route Des Lucioles ; F-G6921 Sophia-Antipolis Cedex ; France, vol. RAN WG1, no. Montreal, Canada; May 10, 2010, May 4, 2010, XP050420079, [retrieved on May 4, 2010].
Nortel: "Discussion paper on the control channel and data channel optimization for relay link", 3GPP Draft; R1-091384 (Nortel-Control Data Relay Link Design in 24,25, LTE-A), 3rd Generation Partnership Project, (3GPP), Mobile Competence Centre ; 650, Route Des Lucioles ; F-06921 38,39, Sophia-Antipolis Cedex ; France, no. Seoul, Korea; Mar. 17, 2009, XP050338973, [retrieved on Mar. 17, 2009].
Samsung: 3GPP Draft; R1-081212 UE-Specific Search Spaces, 3rd Generation Partnership Project (3GPP), Mobile Competence Centre ; 650, Route Des Lucioles ; F-06921 Sophia-Antipolis Cedex ; France, vol. RAN WG1, no. Shenzhen, China; Mar. 26, 2008, XP050109656, [retrieved on Mar. 26, 2008].
ZTE: "Considerations on Demodulation Reference Signal in Backhaul Downlink", 3GPP Draft; R1-093204Backhauldmrs, 3rd Generation Partnership Project (3GPP), Mobile Competence Centre ; 650, Route Des Lucioles ; F-06921 Sophia-Antipolis Cedex ; France, no. Shenzhen, China; Aug. 19, 2009, XP050351557.
ZTE: "Control Channel of Backhaul Link", 3GPP Draft; R1-092468 C0ntr0lchannelbackhaul, 3rd Generation Partnership Project (3GPP), Mobile Competence Centre ; 650, Route Des Lucioles ; F-06921 Sophia-Antipolis Cedex ; France, no. Los Angeles, USA; Jun. 23, 2009, XP050350977, [retrieved on Jun. 23, 2009].
3GPP TSG RAN WG1 meeting #59bis, R1-100269, "Search Space for the R-PDCCH," Jan. 2010.
Panasonic: "R-PDCCH placement", 3GPP Draft; R1-102042, 3rd Generation Partnership Project (3GPP), Mobile Competence Centre, 650, Route Des Lucioles, F-06921 Sophia-anti Polis Cedex, France, vol. RAN WG1, no. Beijing, china; 20100412, 6 Apr. 1, 2010 (Apr. 6, 2010), XP050419373, [retrieved on Apr. 6, 2010].
Taiwan Search Report—TW100115834—TIPO—Oct. 21, 2014.

* cited by examiner

EXPANDED SEARCH SPACE FOR R-PDCCH IN LTE-A

CLAIM OF PRIORITY UNDER 35 U.S.C. §119

The present Application for patent claims benefit of U.S. Provisional Patent Application Ser. No. 61/331,797, entitled, "Expanded Search Space for Reverse Physical Downlink Control Channel," filed May 5, 2010 and assigned to the assignee hereof and hereby expressly incorporated by reference herein.

BACKGROUND

1. Field

Certain aspects of the disclosure relate generally to wireless communications systems and, more particularly, to techniques for signaling a control channel for a relay in a telecommunications network.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-single-out (MISO) or a multiple-in-multiple-out (MIMO) system.

To supplement conventional mobile phone network base stations, additional base stations may be deployed to provide more robust wireless coverage to mobile units. For example, wireless relay stations and small-coverage base stations (e.g., commonly referred to as access point base stations, Home Node Bs, femto access points, or femto cells) may be deployed for incremental capacity growth, richer user experience, and in-building coverage. Typically, such small-coverage base stations are connected to the Internet and the mobile operator's network via DSL router or cable modem. As these other types of base stations may be added to the conventional mobile phone network (e.g., the backhaul) in a different manner than conventional base stations (e.g., macro base stations), there is a need for effective techniques for managing these other types of base stations and their associated user equipment.

SUMMARY

Certain aspects of the present disclosure provide a method for wireless communications. The method generally includes determining, by a relay node, a plurality of layer-specific search spaces. Each layer-specific search space corresponds to a plurality of physical downlink control channel (PDCCH) candidates. The method further includes performing a search of one or more of the layer-specific search spaces for a PDCCH for the relay node.

Certain aspects of the present disclosure provide a method for wireless communications. The method generally includes determining a plurality of layer-specific search spaces. Each layer-specific search space corresponds to a plurality of physical downlink control channel (PDCCH) candidates. The method further includes transmitting, to a relay node, a PDCCH in one of the layer-specific search spaces.

Certain aspects of the present disclosure provide an apparatus for wireless communications. The apparatus generally includes a control module configured to determine a plurality of layer-specific search spaces, each layer-specific search space corresponding to a plurality of physical downlink control channel (PDCCH) candidates. The apparatus further includes a decode module configured to perform a search of one or more of the layer-specific search spaces for a PDCCH for a relay node.

Certain aspects of the present disclosure provide an apparatus for wireless communications. The apparatus generally includes a control module configured to determine a plurality of layer-specific search spaces, each layer-specific search space corresponding to a plurality of physical downlink control channel (PDCCH) candidates. The apparatus further includes a transmitter module configured to transmit, to a relay node, a PDCCH in one of the layer-specific search spaces.

Certain aspects of the present disclosure provide an apparatus for wireless communications. The apparatus generally includes means for determining a plurality of layer-specific search spaces, each layer-specific search space corresponding to a plurality of physical downlink control channel (PDCCH) candidates. The apparatus further includes means for performing a search of one or more of the layer-specific search spaces for a PDCCH for a relay node.

Certain aspects of the present disclosure provide an apparatus for wireless communications. The apparatus generally includes means for determining a plurality of layer-specific search spaces, each layer-specific search space corresponding to a plurality of physical downlink control channel (PDCCH) candidates. The apparatus further includes means for transmitting, to a relay node, a PDCCH in one of the layer-specific search spaces.

Certain aspects of the present disclosure provide a computer-program product comprising a computer-readable medium having instructions stored thereon. The instructions, executable by one or more processors, are generally for determining, by a relay node, a plurality of layer-specific search spaces, each layer-specific search space corresponding to a plurality of physical downlink control channel (PDCCH) candidates, and for performing a search of one or more of the layer-specific search spaces for a PDCCH for the relay node.

Certain aspects of the present disclosure provide a computer-program product comprising a computer-readable medium having instructions stored thereon. The instructions, executable by one or more processors, are generally for, determining a plurality of layer-specific search spaces, each layer-specific search space corresponding to a plurality of physical downlink control channel (PDCCH) candidates, and for transmitting, to a relay node, a PDCCH in one of the layer-specific search spaces.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
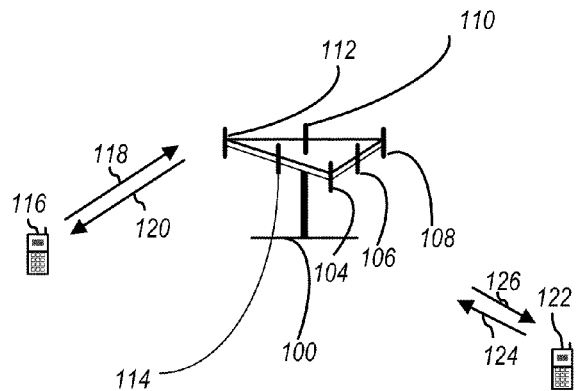
FIG. 1 illustrates a multiple access wireless communication system.

Relaying has been considered for wireless systems, such as LTE-Advanced, as a tool to improve coverage of high data rates, group mobility, temporary network deployment, and the cell-edge throughput and/or to provide coverage in new areas. The A relay node may be wirelessly connected to a radio-access network via a donor base station to provide service to wireless terminals, or user equipment (UE). Certain aspects of the present disclosure provide apparatuses and techniques for managing a control channel in wireless communications between a relay node and a donor base station. To coordinate communication between the relay node and the donor base station, the donor base station transmits and/or broadcasts control information/or and reference signals in periodic intervals to the relay node and other communication apparatuses in an area. The relay node monitors a set of radio resources, referred to as a "search space", to detect transmissions containing control information pertinent to the relay node.

Generally, a "common search space" may be monitored by all relay nodes and/or UEs in an area, and may include information such as paging information, system information, random access procedures, and the like. Additionally, a relay node may monitor a set of radio resources specifically assigned for the relay-node, referred to as a "relay node-specific search space", for control information configured individually for the relay node, such as channel estimates that enable beamforming. However, a relay node faces challenges in receiving control information while concurrently communicating to a plurality of connected UEs on one link and to a donor base station on another link.

Accordingly, certain aspects of the present disclosure provide techniques for utilizing a two-dimensional search space for relay control information. The relay node may perform blind decodes to determine which of a plurality of antenna ports is used for transmission of relay control information. According to certain aspects, a Relay Physical Downlink Control Channel (R-PDCCH) search space may be defined that comprises at least one of a plurality of layer-specific search spaces, where each layer-specific search space corresponds to each of the plurality of antenna ports used to transmit the R-PDCCH, and where each layer-specific search space comprises a common search space and one or more relay-specific search spaces.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA and/or LTE-Advanced.

Referring to FIG. 1, a multiple access wireless communication system according to one aspect is illustrated. An access point 100 (AP) includes multiple antenna groups, one including antennas 104 and 106, another including antennas 108 and 110, and yet another including antennas 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In the aspect shown in FIG. 1, each antenna group is designed to communicate to access terminals in a sector, of the areas covered by access point 100.

In communication over forward links 120 and 126, the transmitting antennas of access point 100 utilize beamforming in order to improve the signal-to-noise ratio (SNR) of forward links for the different access terminals 116 and 122. Also, an access point using beamforming to transmit to access terminals scattered randomly through its coverage causes less interference to access terminals in neighboring cells than an access point transmitting through a single antenna to all its access terminals.

According to certain aspects, an AT 116 may be in communication with an AP 100 by means of a radio interface, such as a Uu interface. Further, additional APs 100 may be inter-connected with each other by means of an interface known as X2, and to a network node, such as an Enhanced Packet Core (EPC) node, by means of an S1 interface.

An access point may be a fixed station used for communicating with the terminals and may be also referred to as a base station, a Node B, an evolved Node B (eNB), an eNodeB, or some other terminology. An access terminal may also be called a mobile station (MS), user equipment (UE), a wireless communication device, wireless terminal, or some other terminology.

Figure 2:
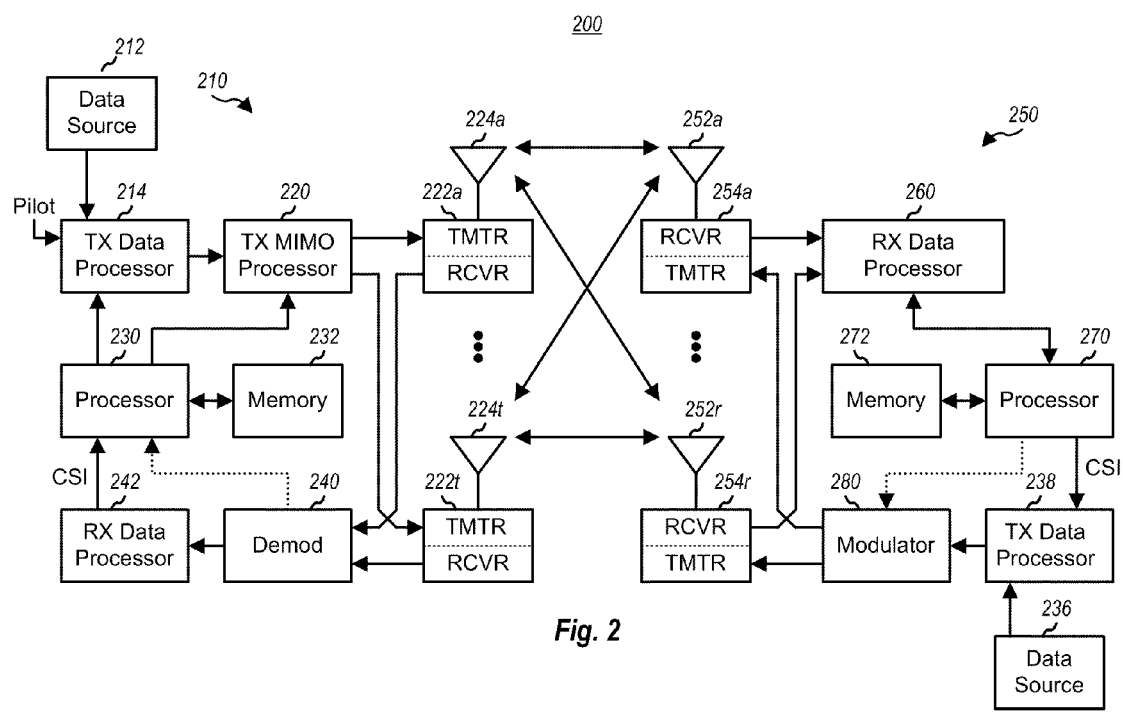
FIG. 2 is a block diagram of a wireless communication system.

FIG. 2 is a block diagram of an aspect of a transmitter system 210 (also known as the access point) and a receiver system 250 (also known as the access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
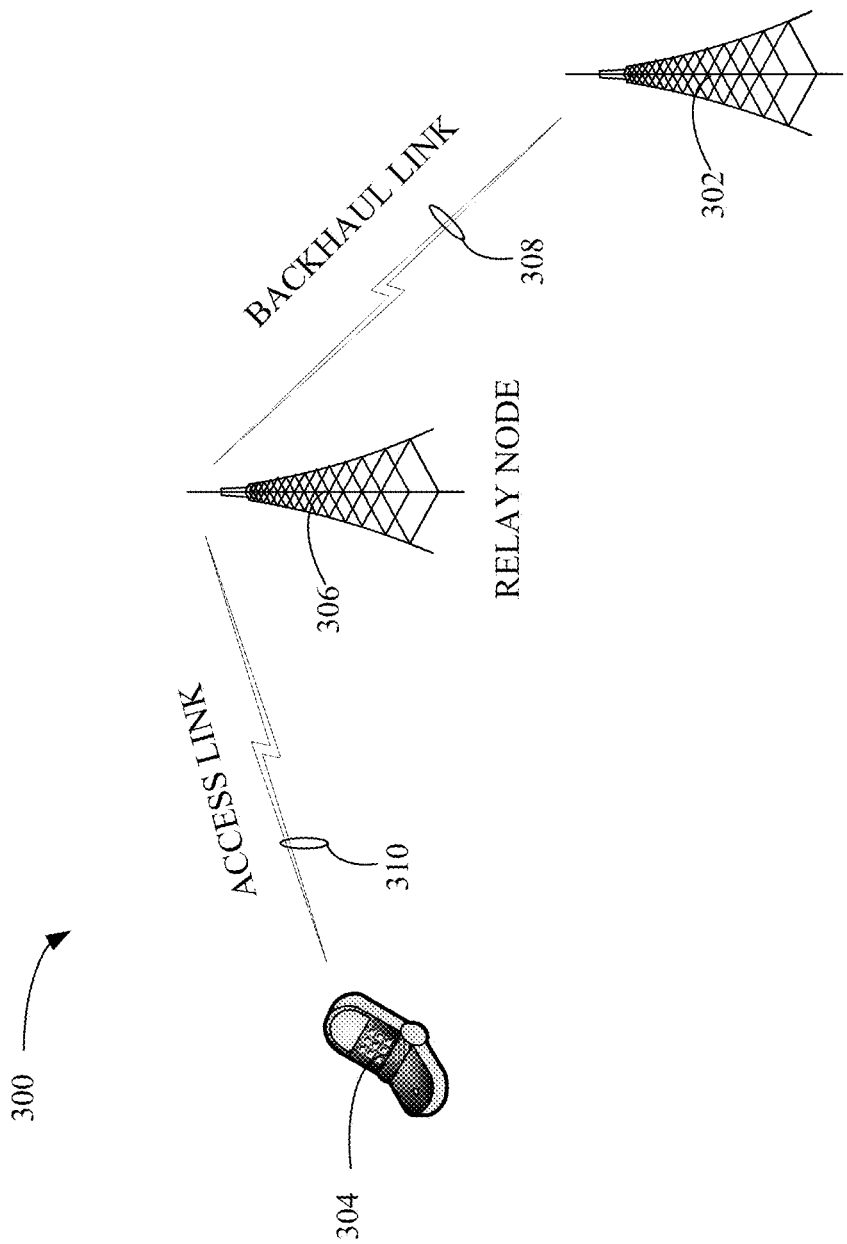
FIG. 3 illustrates an exemplary wireless communication system having a relay.

According to certain aspects of the present disclosure, the transmitter system 210 and the receiver system 250 may include additional components for operating in a wireless communications network having relays, as described herein. Specifically, the transmitter system 210 may be configured as a donor base station and the receiver system 250 may be configured as a relay node as shown in FIG. 3. According to certain aspects, the processor 270 may be configured to determine a plurality of layer-specific search spaces, wherein each layer-specific search space corresponding to a plurality of physical downlink control channel (PDCCH) candidates. According to certain aspects, each of the layer-specific search spaces corresponds to one or more spatial layers, for example, as processed by the TX MIMO processor 220. According to certain aspects, the RX data processor 260 may be configured to perform a search of the one or more layer-specific search spaces for a PDCCH for the relay node by blindly decoding one or more of the PDCCH candidates.

According to certain aspects, logical channels are classified into Control Channels and Traffic Channels. Logical Control Channels comprise a Broadcast Control Channel (BCCH) which is a DL channel for broadcasting system control information, a Paging Control Channel (PCCH) which is a DL channel that transfers paging information, and a Multicast Control Channel (MCCH) which is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information and used by UEs having an RRC connection. In an aspect, Logical Traffic Channels comprise a Dedicated Traffic Channel (DTCH) which is a point-to-point bi-directional channel, dedicated to one UE, for the transfer of user information. Also, a Multicast Traffic Channel (MTCH) is a point-to-multipoint DL channel for transmitting traffic data.

According to certain aspects, Transport Channels are classified into DL and UL. DL Transport Channels comprise a Broadcast Channel (BCH), a Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

For the purposes of the present document, the following abbreviations apply:

| | |
|---|---|
| ACK | Acknowledgement |
| AM | Acknowledged Mode |
| AMD | Acknowledged Mode Data |
| ARQ | Automatic Repeat Request |
| BCCH | Broadcast Control CHannel |
| BCH | Broadcast CHannel |
| BW | Bandwidth |
| C- | Control- |
| CB | Contention-Based |
| CCE | Control Channel Element |
| CCCH | Common Control CHannel |
| CCH | Control CHannel |
| CCTrCH | Coded Composite Transport Channel |
| CDM | Code Division Multiplexing |
| CF | Contention-Free |
| CP | Cyclic Prefix |
| CQI | Channel Quality Indicator |
| CRC | Cyclic Redundancy Check |
| CRS | Common Reference Signal |
| CTCH | Common Traffic CHannel |
| DCCH | Dedicated Control CHannel |
| DCH | Dedicated CHannel |
| DCI | Downlink Control Information |
| DL | DownLink |
| DRS | Dedicated Reference Signal |
| DSCH | Downlink Shared Channel |
| DSP | Digital Signal Processor |
| DTCH | Dedicated Traffic CHannel |
| E-CID | Enhanced Cell IDentification |
| EPS | Evolved Packet System |
| FACH | Forward link Access CHannel |
| FDD | Frequency Division Duplex |
| FDM | Frequency Division Multiplexing |
| FSTD | Frequency Switched Transmit Diversity |
| HARQ | Hybrid Automatic Repeat/request |
| HW | Hardware |
| IC | Interference Cancellation |
| L1 | Layer 1 (physical layer) |
| L2 | Layer 2 (data link layer) |
| L3 | Layer 3 (network layer) |
| LI | Length Indicator |
| LLR | Log-Likelihood Ratio |

-continued

| | |
|---|---|
| LSB | Least Significant Bit |
| MAC | Medium Access Control |
| MBMS | Multimedia Broadcast Multicast Service |
| MCCH | MBMS point-to-multipoint Control Channel |
| MMSE | Minimum Mean Squared Error |
| MRW | Move Receiving Window |
| MSB | Most Significant Bit |
| MSCH | MBMS point-to-multipoint Scheduling CHannel |
| MTCH | MBMS point-to-multipoint Traffic CHannel |
| NACK | Non-Acknowledgement |
| PA | Power Amplifier |
| PBCH | Physical Broadcast CHannel |
| PCCH | Paging Control CHannel |
| PCH | Paging CHannel |
| PCI | Physical Cell Identifier |
| PDCCH | Physical Downlink Control CHannel |
| PDU | Protocol Data Unit |
| PHICH | Physical HARQ Indicator CHannel |
| PHY | PHYsical layer |
| PhyCH | Physical CHannels |
| PMI | Precoding Matrix Indicator |
| PRACH | Physical Random Access Channel |
| PSS | Primary Synchronization Signal |
| PUCCH | Physical Uplink Control CHannel |
| PUSCH | Physical Uplink Shared CHannel |
| QoS | Quality of Service |
| RACH | Random Access CHannel |
| RB | Resource Block |
| RLC | Radio Link Control |
| RRC | Radio Resource Control |
| RE | Resource Element |
| RI | Rank Indicator |
| RNTI | Radio Network Temporary Identifier |
| RS | Reference Signal |
| RTT | Round Trip Time |
| Rx | Receive |
| SAP | Service Access Point |
| SDU | Service Data Unit |
| SFBC | Space Frequency Block Code |
| SHCCH | SHared channel Control CHannel |
| SINR | Signal-to-Interference-and-Noise Ratio |
| SN | Sequence Number |
| SR | Scheduling Request |
| SRS | Sounding Reference Signal |
| SSS | Secondary Synchronization Signal |
| SU-MIMO | Single User Multiple Input Multiple Output |
| SUFI | SUper FIeld |
| SW | Software |
| TA | Timing Advance |
| TCH | Traffic CHannel |
| TDD | Time Division Duplex |
| TDM | Time Division Multiplexing |
| TFI | Transport Format Indicator |
| TPC | Transmit Power Control |
| TTI | Transmission Time Interval |
| Tx | Transmit |
| U- | User- |
| UE | User Equipment |
| UL | UpLink |
| UM | Unacknowledged Mode |
| UMD | Unacknowledged Mode Data |
| UMTS | Universal Mobile Telecommunications System |
| UTRA | UMTS Terrestrial Radio Access |
| UTRAN | UMTS Terrestrial Radio Access Network |
| VOIP | Voice Over Internet Protocol |
| MBSFN | multicast broadcast single frequency network |
| MCH | multicast channel |
| DL-SCH | downlink shared channel |
| PDCCH | physical downlink control channel |
| PDSCH | physical downlink shared channel |

Expanded Search Space for R-PDCCH

As described above, wireless communication systems may comprise a relay node associated with a donor base station to provide service to wireless terminals. As described above, the relay node may be connected to a radio-access network via the donor base station. The relay node may be used to supplement and extend coverage in a given geographical area by providing service to a plurality of UEs through the donor base station.

FIG. 3 illustrates an example wireless system 300 in which certain aspects of the present disclosure may be practiced. As illustrated, the system 300 includes a donor base station (also known as a donor cell, a donor access point (AP), a donor BS, a donor eNodeB, or DeNB) 302 that communicates with a UE 304 via a relay node 306 (also known as relay access point, relay base station, or ReNB). The relay node 306 may communicate with the donor BS 302 via a backhaul link 308 and with the UE 304 via an access link 310. In other words, the relay node 306 may receive downlink messages from the donor BS 302 over the backhaul link 308 and relay these messages to the UE 304 over the access link 310. Similarly, the relay node 306 may receive uplink messages from the UE 304 over the access link 310 and relay these messages to the donor BS 302 over the backhaul link 308.

According to certain aspects, the backhaul link 308 may be an "inband" connection, in which a network-to-relay link, such as the backhaul link 308, shares a same band with direct network-to-UE links within a donor cell defined by the donor base station. LTE Rel-8-compatible UEs may be able to connect to the donor in this case. According to certain aspects, the backhaul link may be an "out of band" connection, in which a network-to-relay link may not operate in the same band as direct-to-UE links within the donor cell.

According to certain aspects, the relay node 306 may be a "Type 1" relay node compatible with LTE-Advanced. A Type 1 relay node is an inband relaying node generally characterized with the following features: A Type 1 relay node controls cells, each of which appears to a UE as a separate cell distinct from the donor cell. The cells may have their own Physical Cell ID (as defined in LTE Rel-8) and the relay node may transmit its own synchronization channels, reference symbols, and other control information. In the context of a single-cell operation, a UE may receive scheduling information and Hybrid Automatic Repeat Request (HARD) feedback directly from the relay node, and the UE may send its control channels (e.g., SR, CQI, ACK) to the relay node. To Rel-8 UEs, a Type 1 relay node may appear as a Rel-8 eNodeB (i.e., the Type 1 relay node may be backwards compatible.) To LTE-Advanced-compatible UEs, a Type 1 relay node may appear differently than a Rel-8 eNodeB to enable and allow for further performance enhancements.

According to certain aspects, for inband relaying, the backhaul link 308 (i.e., the eNodeB-to-relay link) may operate in the same frequency as the access link 310 (i.e., the relay-to-UE link). Due to the fact that relay's transmitter may cause interference with the relay's own receiver, simultaneous eNodeB-to-relay and relay-to-UE transmissions on the same frequency resources may not be feasible. For example, the relay node 306 may have difficulty receiving a control channel from the donor base station 302 during a conventional PDCCH period because the relay node 306 may have to transmit its own reference signals to the UEs 304 during this time. As such, in order to allow inband backhauling of relay traffic on the backhaul link 308, some resources in the time-frequency domain may be set aside for the backhaul link 308 and may not be used for the access link 310 on the respective relay node 306. According to certain aspects, the relay node 306 may be configured for half-duplex operation, as described below, such that a control channel for the backhaul link 308 may be received by the relay node 306 in a time-frequency domain reserved for downlink data transmission from the donor base station 302 to the relay node 306.

According to certain aspects, the relay node 306 may be configured according to general principles of resource partitioning for half-duplex operation. Firstly, downlink backhaul and downlink access links (i.e., eNodeB-to-relay and relay-to-UE) may be time division multiplexed in a single frequency band. In other words, only one of the downlink backhaul and downlink access links may be any time. Secondly, uplink backhaul and uplink access links (i.e., relay-to-eNodeB and UE-to-relay) are also time division multiplexed in a single frequency band. In other words, only one of uplink backhaul and uplink access may be active at any time.

Transmission of downlink and uplink backhaul may be transmitted utilizing radio resources according to certain aspects described herein. For example, at the relay node, a boundary of an access link downlink subframe may be aligned with a boundary of a backhaul link downlink subframe, notwithstanding possible adjustment allowing for relay node transmit and/or receive switching. According to certain aspects, the set of downlink backhaul subframes, during which downlink backhaul transmission may occur, may be semi-statically assigned. The set of uplink backhaul subframes, during which uplink backhaul transmission may occur, may also be semi-statically assigned, or may be implicitly derived from the downlink backhaul subframes using the HARQ timing relationship.

According to certain aspects, a physical control channel (herein referred to as Relay Physical Downlink Control Channel, or "R-PDCCH") may be used to dynamically or "semi-persistently" assign resources, within the semi-statically assigned subframes, for downlink backhaul data (corresponding to a physical channel such as a Relay Physical Downlink Shared Channel, or "R-PDSCH"). According to certain aspects, the R-PDCCH may assign downlink resources in the same and/or in one or more later subframes. According to certain aspects, the R-PDCCH may also be used to dynamically or "semi-persistently" assign resources for uplink backhaul data (corresponding to a physical channel such as a Relay Physical Uplink Shared Channel, "R-PUSCH"). According to certain aspects, the R-PDCCH may assign uplink resources in one or more later subframes.

According to certain aspects, within physical resource blocks (PRBs) semi-statically assigned for R-PDCCH transmission, a subset of the resources may be used for each R-PDCCH. The actual overall set of resources used for R-PDCCH transmission within the above mentioned semi-statically assigned PRBs may vary dynamically between subframes. These resources may correspond to the full set of OFDM symbols available for the backhaul link or be constrained to a subset of these OFDM symbols. The resources that are not used for R-PDCCH within the above-mentioned semi-statically assigned PRBs may be used to carry R-PDSCH or PDSCH. According to certain aspects, the R-PDCCH may be transmitted starting from an OFDM symbol within a subframe that is late enough such that a relay may receive it. R-PDSCH and R-PDCCH may be transmitted within the same PRBs or within separate PRBs as described further below.

According to certain aspects, the detailed R-PDCCH transmitter processing (i.e., channel coding, interleaving, multiplexing, etc.) may re-use LTE Rel-8 functionality to the extent possible, but may allow for the removal of certain unnecessary procedures or bandwidth-occupying procedures by considering the properties of the relay node. According to certain aspects, a "search space" approach for the backhaul link may be adapted from LTE Rel-8, utilizing a common search space that can be semi-statically configured (and may potentially include an entire system bandwidth). Additionally, a relay-node specific search space may be configured that is implicitly or explicitly known by the relay node.

Figure 4:
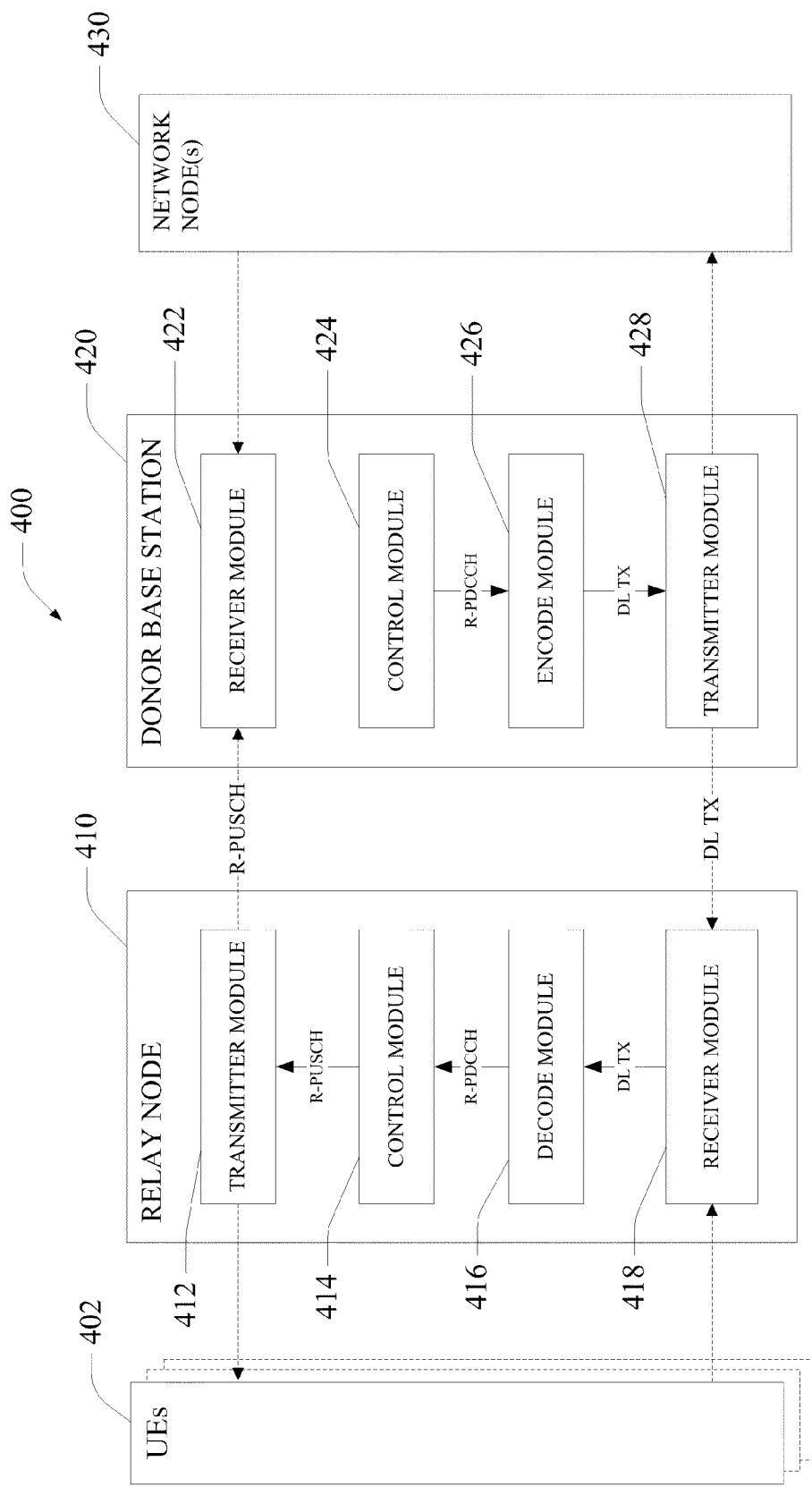
FIG. 4 is a block diagram illustrating example modules of a wireless communication system capable of implementing techniques presented herein.

FIG. 4 illustrates an example wireless system 400 capable for performing operations described herein for monitoring a search space for control channel transmissions. As illustrated, the wireless system 400 represents a wireless telecommunications network having a plurality of UEs 402, a relay node 410, a donor base station 420, at least one network node(s) 430. According to certain aspects, the network node(s) 430 represent one or more network components part of an Evolved Packet Core (EPC) network, such as a Mobility Management Entity (MME) or Serving/PDN Gateway (S-P GW) for at least one of the plurality of UEs 402 or a MME for the relay node 410. According to certain aspects, one or more modules of the donor base station 420 may be utilized as an S/P GW module for the relay node 410, wherein the S/P GW module is collocated with the donor base station 420.

According to certain aspects, the donor base station may include a control module 424 configured to generate a control channel comprising control information for a relay node 410, such as resource assignments, channel estimates for beamforming, etc. In FIG. 4, the control channel is depicted as an R-PDCCH message. As illustrated, the control module 424 provides the R-PDCCH message to an encode module 426 which is configured to encode the R-PDCCH message for downlink transmission utilizing a Spatial Division Multiple Access (SDMA) scheme. As illustrated, the encode module 426 provides the encoded downlink (DL) transmission to a transmitter module 428 for transmission to the relay node 410. According to certain aspects, the transmitter module 428 may transmit the downlink transmission utilizing a SDMA transmission scheme. According to certain aspects, the transmitter module 428 may transmit the downlink transmission having the R-PDCCH utilizing one of a plurality of antenna ports.

According to certain aspects, the relay node 410 includes a receiver module 418 configured to receive the downlink transmission from the donor base station 420. As illustrated, the receiver module 418 provides the downlink transmission to a decode module 416 configured to decode the downlink transmissions to detect an R-PDCCH message. As illustrated, the decode module 416 provides a detected R-PDCCH message to a control module 414 which is configured to process the R-PDCCH to determine control information, such as uplink grants of resources for uplink backhaul data transmission. The control module 414 may utilize the R-PDCCH to generate an uplink backhaul data transmission (i.e., R-PUSCH). As illustrated, the control module 414 provides R-PUSCH to a transmitter module 412 for transmission to the donor base station utilizing the resources assigned via the R-PDCCH. According to certain aspects, the control module 414 may also process the R-PDCCH to determine downlink grants for downlink backhaul data transmission also received by the receiver module 418.

According to certain aspects, various schemes for placement of R-PDCCH within a transmission may be considered, such as "Pure Frequency Division Multiplexing (FDM)" design and a "Hybrid FDM and Time Division Multiplexing (TDM)" design.

Figure 5:
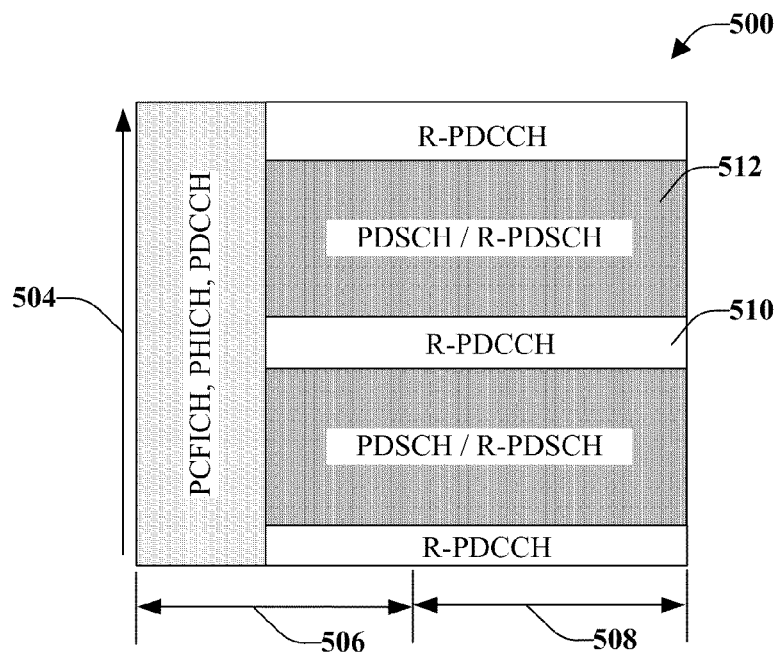
FIGS. 5-7 illustrate examples of radio structure for a relay control channel according to certain aspects of the disclosure.

FIG. 5 illustrates a Pure FDM transmission scheme 500 wherein a limited number of resource blocks (RBs) are allocated exclusively for transmitting R-PDCCH (and possibly Relay Physical HARQ Indicator Channel, or R-PHICH, if supported). As illustrated, a set of resources in the frequency domain 504 are allocated for transmission of R-PDCCH across a time domain comprising a first time slot 506 and a second time slot 508. According to certain aspects, the Pure FDM scheme 500 separates a relay's control region (i.e., R-PDCCH 510) from regular PDSCH and the relay's R-PDSCH transmissions 512, which facilities multiplexing and minimizes scheduling complexity. As illustrated, a single R-PDCCH 510 is interleaved across a limited number of RBs in order to achieve frequency and interference diversity.

Figure 6:
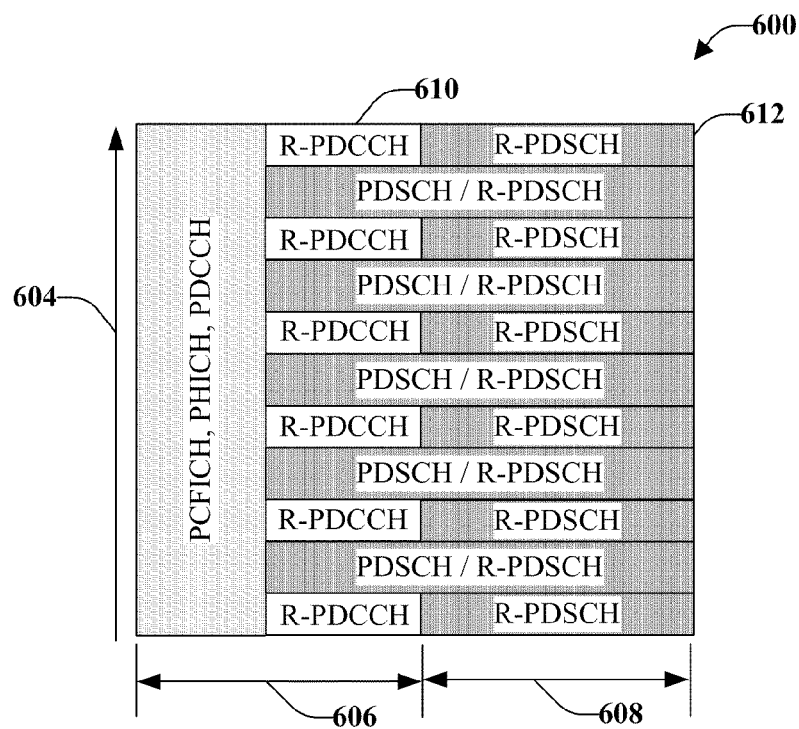

FIG. 6 illustrates a Hybrid FDM-TDM transmission scheme 600, wherein an R-PDCCH 610 may be transmitted on a subset of RBs from the frequency domain 604. According to certain aspects, among those RBs, only symbols from within a first time slot 606 for transmission of the R-PDCCH. As illustrated, the remaining RBs may be utilized for transmitting the relay's R-PDSCH data transmission 612.

Figure 7:
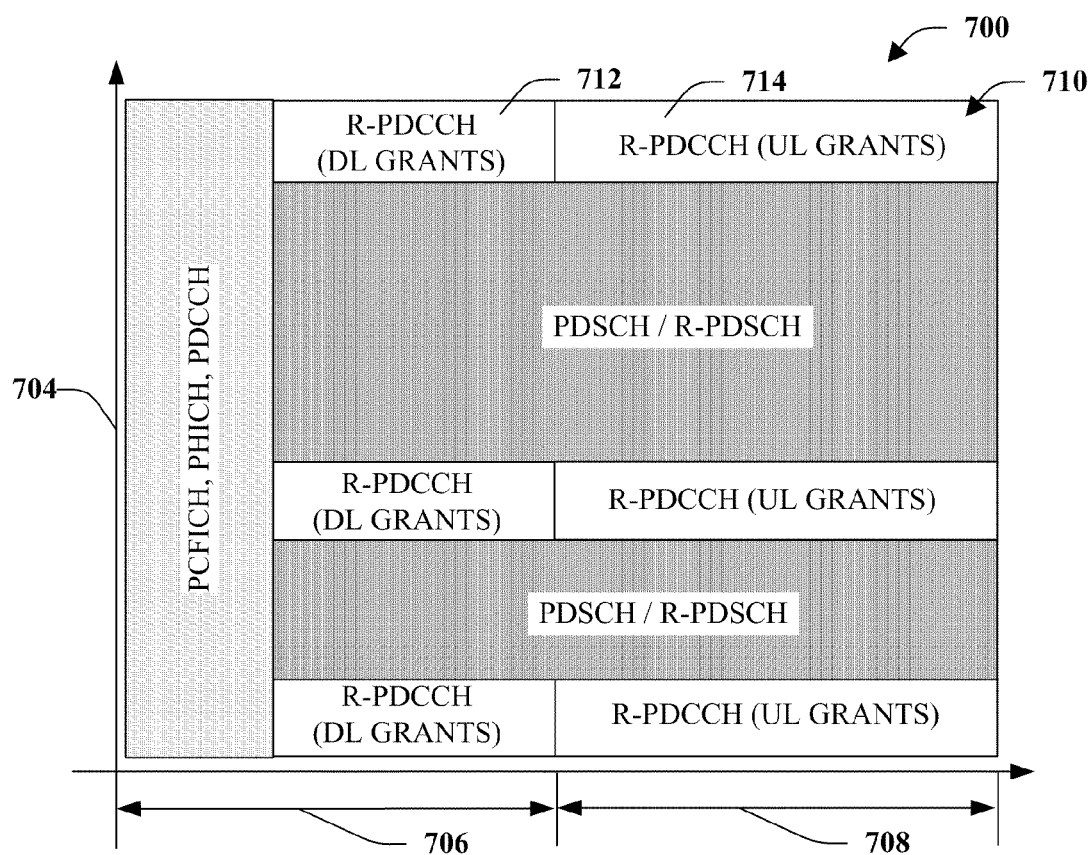

FIG. 7 illustrates a Pure FDM transmission scheme 700 for transmitting R-PDCCH 710 according to certain aspects of the present disclosure. Similar to the transmission scheme illustrated in FIG. 5, a set of PRBs are allocated across the frequency domain 704 for transmission of R-PDCCH 710 across a first time slot 706 and a second time slot 708. However, as illustrated, R-PDCCH comprising downlink (DL) grants 712 for the relay node are transmitted in the first slot 706, and R-PDCCH comprising uplink (UL) grants are transmitted in the second slot 708. It is noted that the grants in the same PRB pair may or may not be associated with the same relay node.

According to certain aspects, a transmission scheme may be provided wherein DL grants 712 are always be transmitted in the first time slot 706 of a subframe for timing purposes. According to certain aspects, if a DL grant is transmitted in a first PRB of a given PRB pair, then an UL grant may be transmitted in a second PRB of the PRB pair. Otherwise, an UL grant may be transmitted in either the first or second PRB of the PRB pair. According to certain aspects, in cases of transmission of a demodulation reference signal (DM-RS), the DL grant and UL grant in a PRB pair may be associated with the same relay node. In other words, no resource elements (REs) may in such a PRB pair may be used for a different relay node. According to certain aspects, in cases of a common reference signal (CRS) transmission, the DL grant and UL grant in a PRB pair may be for the same relay node or may be for different relays.

Generally, in LTE Rel-8, each UE monitors both a common search space and a UE-specific search space. Accordingly, each UE may attempt to decode a number of transmissions in the common search space and UE-specific search to detect a control channel for the UE. The number of PDCCH candidates that a UE has to attempt to decode in a subframe is provided below in Table 1.

TABLE 1

Number of PDCCH candidates monitored by a UE

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As illustrated, there are up to 6 candidates in the common search space (i.e., 4 for CCE aggregation level 4, and 2 for aggregation level 8), and up to 16 candidates in the UE-specific search space (i.e., 6 for level 1, 6 for level 2, 2 for level 4, and 2 for level 8).

Each UE may be configured via Radio Resource Control (RRC) to operate with one of nine transmission modes. Under each transmission mode, each UE may be configured to monitor 2 different PDCCH sizes. As a result, the number of hypotheses detections is:

$$(6+16)*2=44 \qquad (1)$$

It is also noted that each UE may be assigned two Radio Network Temporary Identifiers (RNTIs) (such as, a Cell RNTI, or C-RNTI, and a Semi-Persistent Scheduling C-RNTI, or SPS C-RNTI). The determination of UE-specific search space is based on one RNTI (e.g. C-RNTI) only, and the search space may vary from subframe to subframe. To be more specific, the CCEs corresponding to PDCCH candidate m of the UE-specific search space with aggregation level L may be given by $$L \cdot \{(Y_k+m) \bmod \lfloor N_{CCE,k}/L \rfloor\}+i \qquad (2)$$

where $Y_k$ is defined below, $i=0, \ldots, L-1$, $m=0, \ldots, M^{(L)}-1$. $M^{(L)}$ is the number of PDCCH candidates to monitor in the given search space defined in Table 1, and the variable $Y_k$ is defined by $$Y_k=(A \cdot Y_{k-1}) \bmod D \qquad (3)$$

where $Y_{-1}=n_{RNTI} \neq 0$, $A=39827$, $D=65537$, $k \lfloor n_s/2 \rfloor$, $n_s$ is the slot number within a radio frame taking value s from 0, 1, . . . , 19, and $n_{RNTI}$ corresponds to one unique RNTI value.

According to certain aspects, a UE-specific search space may be configured such that the search spaces for different UEs may or may not overlap. According to certain aspects, the search space for a given UE may change over various subframes, and may repeat every 10 subframes (i.e., every 10 ms). According to certain aspects, the search space for different aggregation levels may follow a tree-structure, i.e., the CCEs for aggregation level L always start with integer multiples of L.

Generally, as discussed above, PRBs utilized for R-PDCCH may be semi-statically configured. According to certain aspects, a relay node may be configured to monitor some PRBs (i.e., a search space) for R-PDCCH assignments. The search spaces for a relay node may comprise a common search space, as well as a relay node-specific search space. A relay node may be configured to perform blind PDCCH decodes to look for potential DL and UL assignments.

Accordingly, a mechanism is provided herein that may be used to expand an R-PDCCH search space, for example, for cases when DM-RS is utilized for R-PDCCH demodulation. To facilitate understanding, certain examples may be explained with an assumption that R-PDCCH for a given relay node is transmitted using one layer (i.e., no spatial multiplexing for the given relay node), however it is understood that the certain aspects of the present disclosure may be extended to cases where two or more spatial layers are utilized for R-PDCCH.

Figure 8:
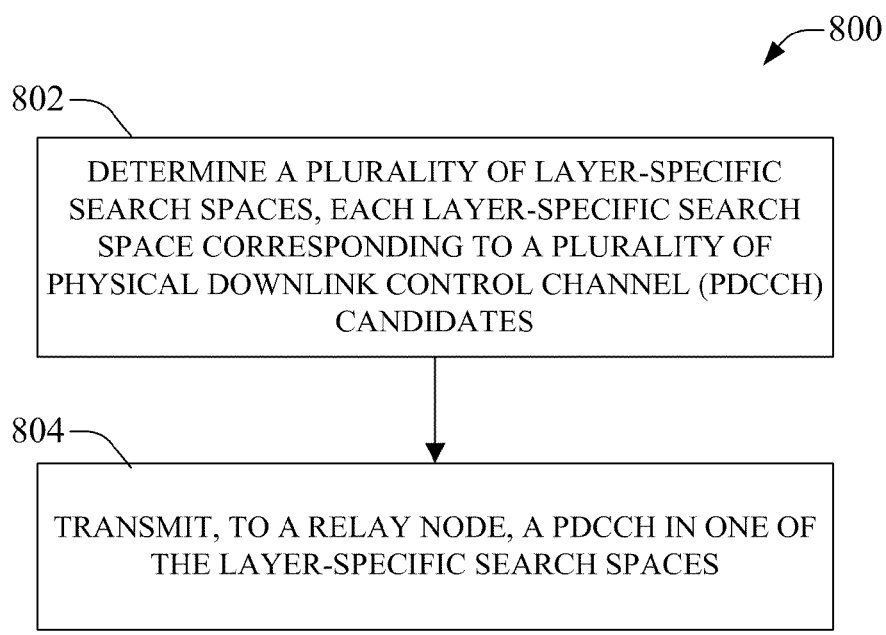
FIG. 8 illustrates example operations that may be performed by a base station to transmit control information according to certain aspects of the present disclosure.

FIG. 8. Illustrates an example operation 800 for signaling a control channel across a backhaul link according to certain aspects of the present disclosure. While the example operation 800 is described as being performed by a donor base station, it is contemplated that the example operation 800 may be performed by other suitable apparatuses configured according to certain aspects of the present disclosure. For example, the example operation 800 may be applicable to a control channel signaled for access links (i.e., links between an eNodeB or relay node and a UE).

The example operation 800 begins at 802 where a donor base station determines a plurality of layer-specific search spaces. Each layer-specific search space may correspond to a plurality of physical downlink control channel (PDCCH) candidates. According to certain aspects, each of the plurality of layer-specific search spaces corresponds to one of a plurality of antenna ports utilized to transmit a reference signal. An antenna port may refer to a single physical antenna or to a combination of multiple physical antenna elements utilized to wirelessly transmit data signals. According to certain aspects, an antenna port may comprise a port for DM-RS transmission. As described further below, the donor base station may be configured such that only one (i.e., no spatial multiplexing) of the plurality of antenna ports may be utilized to transmit a control channel to a relay node. As such, PDCCH for the relay (i.e., R-PDCCH) may be found in one of the plurality layer-specific search spaces.

According to certain aspects, each layer-specific search space may further correspond to multiple PDCCH candidates from a common search space and a relay node-specific search space. The common search space may include a plurality of PRBs designated for all UEs or relay nodes in the cell of the donor base station to monitor. The relay node-specific search space may represent a plurality of PRBs designated for a given relay node to monitor to receive control information for the relay node. According to certain aspects, the donor base station may transmit a semi-static assignment of the relay node-specific search space comprising a plurality of PRBs designated for the relay node to monitor for R-PDCCH from the donor base station. It is noted that the common search space and the relay node-specific search space may overlap.

At 804, the donor base station transmits, to a relay node, a PDCCH in one of the layer-specific search spaces. According to certain aspects, the donor base station transmits a PDCCH for the relay node (i.e., an R-PDCCH). As noted above, according to certain aspects, the R-PDCCH may have been transmitted to the relay node utilizing one of a plurality of antenna ports corresponding to a plurality of spatial layers. According to certain aspects, the R-PDCCH comprises a channel estimate (and reference signal) corresponding to the radio channel for a given antenna port.

According to certain aspects, where the donor base station transmits to the relay node a PDCCH for DM-RS-based demodulation, some precoding may be applied to the backhaul transmission. Only one DM-RS port may be necessary to support R-PDCCH for each relay node in a wireless system. According to certain aspects, it is understood that it may be possible to support multiple relay nodes in one PRB pair, resulting in spatial division multiple access (SDMA) operation for R-PDCCH. According to certain aspects, different relay nodes in a SDMA scheme may use different DM-RS ports.

Figure 9:
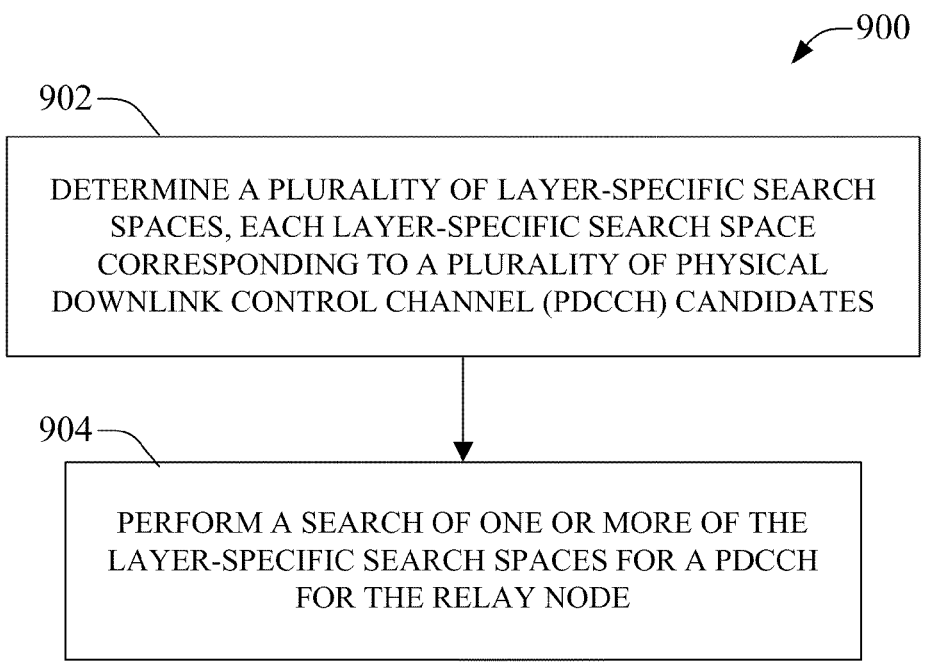
FIG. 9 illustrates example operations that may be performed by a relay node to detect control information according to certain aspects of the present disclosure.

FIG. 9 illustrates an example operation 900 for operating a relay node, according to certain aspects of the present disclosure. The example operation 900 begins at 902 where a relay node determines a plurality of layer-specific search spaces, where each layer-specific search space corresponds to a plurality of R-PDCCH candidates. According to certain aspects, each layer-specific search space may correspond to multiple R-PDCCH candidates from a common search space and a relay node-specific search space. According to certain aspects, the relay node may receive a semi-static assignment of the relay node-specific search space comprising a plurality of physical resource blocks designated for a relay.

At 904, the relay node may perform a search of one or more of the layer-specific search spaces for a PDCCH for the relay node. According to certain aspects, the relay node may perform a search by attempting to decode at least one of the R-PDCCH candidates in one of the layer-specific search spaces of a received transmission. If decoding the R-PDCCH candidate is unsuccessful, the relay node may select other R-PDCCH candidates in the layer-specific search space and/or the common search space and relay node-specific search space and continue to "blindly decode" the R-PDCCH candidates until a control channel for the relay node is detected.

According to certain aspects, the total amount of R-PDCCH decoding candidates may be divided between the plurality of layer-specific search spaces. For example, one half of the PDCCH candidates (e.g., 22) may reside in a first layer-specific search space corresponding to a first antenna port, and the remaining R-PDCCH candidates (e.g., 22) may reside in a second layer-specific search space corresponding to a first antenna port. According to certain aspects, the number of R-PDCCH decoding candidates may be a pre-determined amount selected to reduce blocking and/or probability of collisions. The number of R-PDCCH decoding candidates may also be limited to control decoding complexity of R-PDCCH. According to certain aspects, the number of R-PDCCH decoding candidates may be selected to satisfy a LTE Rel-8 requirement for maximum blind decodes (i.e., no greater than 44 decoding candidates).

According to certain aspects, each of the plurality of layer-specific search spaces corresponds to one of a plurality of antenna ports utilized to transmit a reference signal to the relay node. For example, an antenna port may comprise a DM-RS port. According to certain aspects, the relay node may blind decode an R-PDCCH decoding candidate in a given layer-specific search space to detect a reference signal that enables beamforming with a DM-RS port corresponding to the layer-specific search space. The DM-RS ports may be orthogonally multiplexed with each other and the data so that the UE can obtain reliable channel estimation for each candidate layer-specific search space.

According to certain aspects, for DM-RS-based R-PDCCH demodulation, the relay node may not be indicated by a donor base station which DM-RS port is being used for R-PDCCH transmission. As such, the relay node may perform blind decodes to determine which DM-RS port is being used for R-PDCCH transmission. In other words, this effectively introduces another dimension to an R-PDCCH search space. Accordingly, the R-PDCCH search space may comprise a first part where R-PDCCH is transmitted by utilizing one of plurality of DM-RS ports (or, equivalently, spatial layers), and a second part, where, for each layer, there are multiple R-PDCCH decoding candidates from a common search space and/or a relay node-specific search space.

According to certain aspects, a two-dimensional R-PDCCH search space as described herein advantageously provides additional flexibility for a donor base station to schedule R-PDCCH. In order to control R-PDCCH decoding complexity, according to certain aspects, a total number of blind decodes for R-PDCCH may satisfy the requirement of an upper limit for the number of R-PDCCH blind decodes (e.g., 44 as in LTE Rel-8). According to certain aspects, it is understood that a mechanism as described herein may also be applicable when R-PDCCH is utilized for access links (i.e., links between a base station/relay node and a UE). According, techniques described herein may be extended to permit SDMA signaling of DM-RS for UEs to enable beamforming.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for transmitting may comprise a transmitter, such as the transmitter unit 254 of the receiver system 250 (e.g., the access terminal) depicted in FIG. 2 or the transmitter unit 222 of the transmitter system 210 (e.g., the access point) shown in FIG. 2. Means for receiving may comprise a receiver, such as the receiver unit 254 of the receiver system 250 depicted in FIG. 2 or the receiver unit 222 of the transmitter system 210 shown in FIG. 2. Means for determining and/or means for performing may comprise a processing system, which may include one or more processors, such as the processor 270 and RX data processor 260 of the receiver system 250 or the processor 230 of the transmitter system 210 illustrated in FIG. 2. These means may also comprise any suitable combination of the transmitter modules 412, 428, the receiver modules 418, 422, the control modules 414, 424, the decode module 416, and the encode module 426 of FIG. 4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications by a node, comprising:
   determining, based on an identity of the node, a plurality of layer-specific search spaces corresponding to a plurality of spatial layers, wherein each layer-specific search space comprises time and frequency resources used by physical downlink control channel (PDCCH) transmission on a corresponding spatial layer of the plurality of spatial layers by an antenna port associated with the spatial layer; and
   performing a search of one or more of the layer-specific search spaces for a PDCCH for the node.

2. The method of claim 1, wherein each layer-specific search space corresponds to multiple PDCCH candidates from a common search space and a node-specific search space.

3. The method of claim 1, wherein each antenna port comprises a demodulation reference signal (DM-RS) port used for PDCCH demodulation.

4. The method of claim 1, wherein the plurality of PDCCH candidates comprise no greater than 44 decoding candidates.

5. The method of claim 1, further comprising:
   receiving a semi-static assignment of a node-specific search space comprising a plurality of physical resource blocks designated for the node.

6. The method of claim 1, wherein the PDCCH for the node is received utilizing a spatial division multiple access (SDMA) scheme.

7. A method for wireless communications, comprising:
   determining a plurality of layer-specific search spaces corresponding to a plurality of spatial layers, wherein each layer-specific search space comprises time and frequency resources used by physical downlink control channel (PDCCH) transmission to a node on a corresponding spatial layer of the plurality of spatial layers by an antenna port associated with the spatial layer; and
   transmitting, to the node, a PDCCH in one of the layer-specific search spaces.

8. The method of claim 7, wherein each layer-specific search space corresponds to multiple PDCCH candidates from a common search space and a node-specific search space.

9. The method of claim 7, wherein each antenna port comprises a demodulation reference signal (DM-RS) port used for PDCCH demodulation.

10. The method of claim 7, wherein the plurality of PDCCH candidates comprise no greater than 44 decoding candidates.

11. The method of claim 7, further comprising:
    transmitting a semi-static assignment of a node-specific search space comprising a plurality of physical resource blocks designated for the node.

12. The method of claim 7, wherein the transmitting comprises transmitting the PDCCH utilizing a spatial division multiple access (SDMA) scheme.

13. An apparatus for wireless communications, comprising:
    a control module configured to determine, based on an identity of the apparatus, a plurality of layer-specific search spaces corresponding to a plurality of spatial layers, wherein each layer-specific search space comprises time and frequency resources used by physical downlink control channel (PDCCH) transmission to a node on a corresponding spatial layer of the plurality of spatial layers by an antenna port associated with the spatial layer; and
    a decode module configured to perform a search of one or more of the layer-specific search spaces for a PDCCH for the node.

14. The apparatus of claim 13, wherein each layer-specific search space corresponds to multiple PDCCH candidates from a common search space and a node-specific search space.

15. The apparatus of claim 13, wherein each antenna port comprises a demodulation reference signal (DM-RS) port used for PDCCH demodulation.

16. The apparatus of claim 13, wherein the plurality of PDCCH candidates comprise no greater than 44 decoding candidates.

17. The apparatus of claim 13, further comprising:
    a receiver module configured to receive a semi-static assignment of a node-specific search space comprising a plurality of physical resource blocks designated for the node.

18. The apparatus of claim 13, wherein the PDCCH for the node is received utilizing a spatial division multiple access (SDMA) scheme.

19. An apparatus for wireless communications, comprising:
    a control module configured to determine a plurality of layer-specific search spaces corresponding to a plurality of spatial layers, wherein each layer-specific search space comprises time and frequency resources used by physical downlink control channel (PDCCH) transmission to a node on a corresponding spatial layer of the plurality of spatial layers by an antenna port associated with the spatial layer; and
    a transmitter module configured to transmit, to the node, a PDCCH in one of the layer-specific search spaces.

20. The apparatus of claim 19, wherein each layer-specific search space corresponds to multiple PDCCH candidates from a common search space and a node-specific search space.

21. The apparatus of claim 19, wherein each antenna port comprises a demodulation reference signal (DM-RS) port used for PDCCH demodulation.

22. The apparatus of claim 19, wherein the plurality of PDCCH candidates comprise no greater than 44 decoding candidates.

23. The apparatus of claim 19, wherein the transmitter module is further configured to transmit a semi-static assignment of a node-specific search space comprising a plurality of physical resource blocks designated for the node.

24. The apparatus of claim 19, wherein the transmitter module is further configured to transmit the PDCCH utilizing a spatial division multiple access (SDMA) scheme.

25. An apparatus for wireless communications, comprising:
means for determining, based on an identity of the apparatus, a plurality of layer-specific search spaces corresponding to a plurality of spatial layers, wherein each layer-specific search space comprises time and frequency resources used by physical downlink control channel (PDCCH) transmission to a node on a corresponding spatial layer of the plurality of spatial layers by an antenna port associated with the spatial layer; and
means for performing a search of one or more of the layer-specific search spaces for a PDCCH for the node.

26. The apparatus of claim 25, wherein each layer-specific search space corresponds to multiple PDCCH candidates from a common search space and a node-specific search space.

27. The apparatus of claim 25, wherein each antenna port comprises a demodulation reference signal (DM-RS) port used for PDCCH demodulation.

28. The apparatus of claim 25, wherein the plurality of PDCCH candidates comprise no greater than 44 decoding candidates.

29. The apparatus of claim 25, further comprising:
means for receiving a semi-static assignment of a node-specific search space comprising a plurality of physical resource blocks designated for the node.

30. The apparatus of claim 25, wherein the PDCCH for the node is received utilizing a spatial division multiple access (SDMA) scheme.

31. An apparatus for wireless communications, comprising:
means for determining a plurality of layer-specific search spaces corresponding to a plurality of spatial layers, wherein each layer-specific search space comprises time and frequency resources used by physical downlink control channel (PDCCH) transmission to a node on a corresponding spatial layer of the plurality of spatial layers by an antenna port associated with the spatial layer; and
means for transmitting, to the node, a PDCCH in one of the layer-specific search spaces.

32. The apparatus of claim 31, wherein each layer-specific search space corresponds to multiple PDCCH candidates from a common search space and a node-specific search space.

33. The apparatus of claim 31, wherein each antenna port comprises a demodulation reference signal (DM-RS) port used for PDCCH demodulation.

34. The apparatus of claim 31, wherein the plurality of PDCCH candidates comprise no greater than 44 decoding candidates.

35. The apparatus of claim 31, further comprising:
means for transmitting a semi-static assignment of a node-specific search space comprising a plurality of physical resource blocks designated for the node.

36. The apparatus of claim 31, wherein the means for transmitting comprises means for transmitting the PDCCH utilizing a spatial division multiple access (SDMA) scheme.

37. A computer-program product comprising a non-transitory computer-readable medium having instructions stored thereon, the instructions executable by one or more processors in a node for:
determining, based on an identity of the node, a plurality of layer-specific search spaces corresponding to a plurality of spatial layers, wherein each layer-specific search space comprises time and frequency resources used by physical downlink control channel (PDCCH) transmission on a corresponding spatial layer of the plurality of spatial layers by an antenna port associated with the spatial layer; and
performing a search of one or more of the layer-specific search spaces for a PDCCH for the node.

38. The computer-program product of claim 37, wherein each layer-specific search space corresponds to multiple PDCCH candidates from a common search space and a node-specific search space.

39. The computer-program product of claim 37, wherein each antenna port comprises a demodulation reference signal (DM-RS) port used for PDCCH demodulation.

40. The computer-program product of claim 37, wherein the plurality of PDCCH candidates comprise no greater than 44 decoding candidates.

41. The computer-program product of claim 37, wherein the instructions further comprise instructions for:
receiving a semi-static assignment of a node-specific search space comprising a plurality of physical resource blocks designated for the node.

42. The computer-program product of claim 37, wherein the PDCCH for the node is received utilizing a spatial division multiple access (SDMA) scheme.

43. A computer-program product comprising a non-transitory computer-readable medium having instructions stored thereon, the instructions executable by one or more processors for:
determining a plurality of layer-specific search spaces corresponding to a plurality of spatial layers, wherein each layer-specific search space comprises time and frequency resources used by physical downlink control channel (PDCCH) transmission to a node on a corresponding spatial layer of the plurality of spatial layers by an antenna port associated with the spatial layer; and
transmitting, to the node, a PDCCH in one of the layer-specific search spaces.

44. The computer-program product of claim 43, wherein each layer-specific search space corresponds to multiple PDCCH candidates from a common search space and a node-specific search space.

45. The computer-program product of claim 43, wherein each antenna port comprises a demodulation reference signal (DM-RS) port used for PDCCH demodulation.

46. The computer-program product of claim 43, wherein the plurality of PDCCH candidates comprise no greater than 44 decoding candidates.

47. The computer-program product of claim 43, wherein the instructions further comprise instructions for:
transmitting a semi-static assignment of a node-specific search space comprising a plurality of physical resource blocks designated for the node.

48. The computer-program product of claim 43, wherein the instructions for transmitting comprises instructions for transmitting the PDCCH utilizing a spatial division multiple access (SDMA) scheme.

* * * * *